Figure 1:
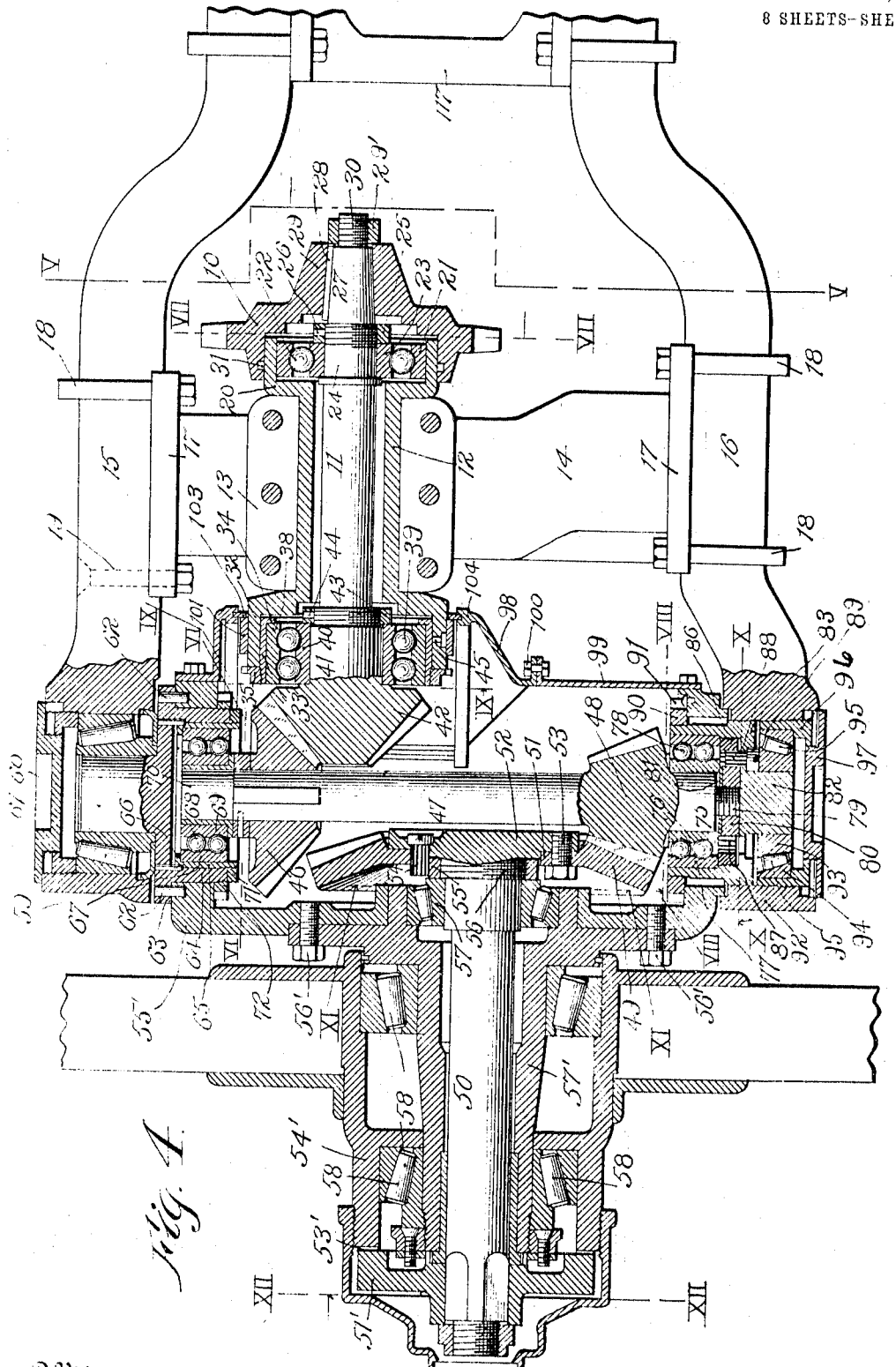

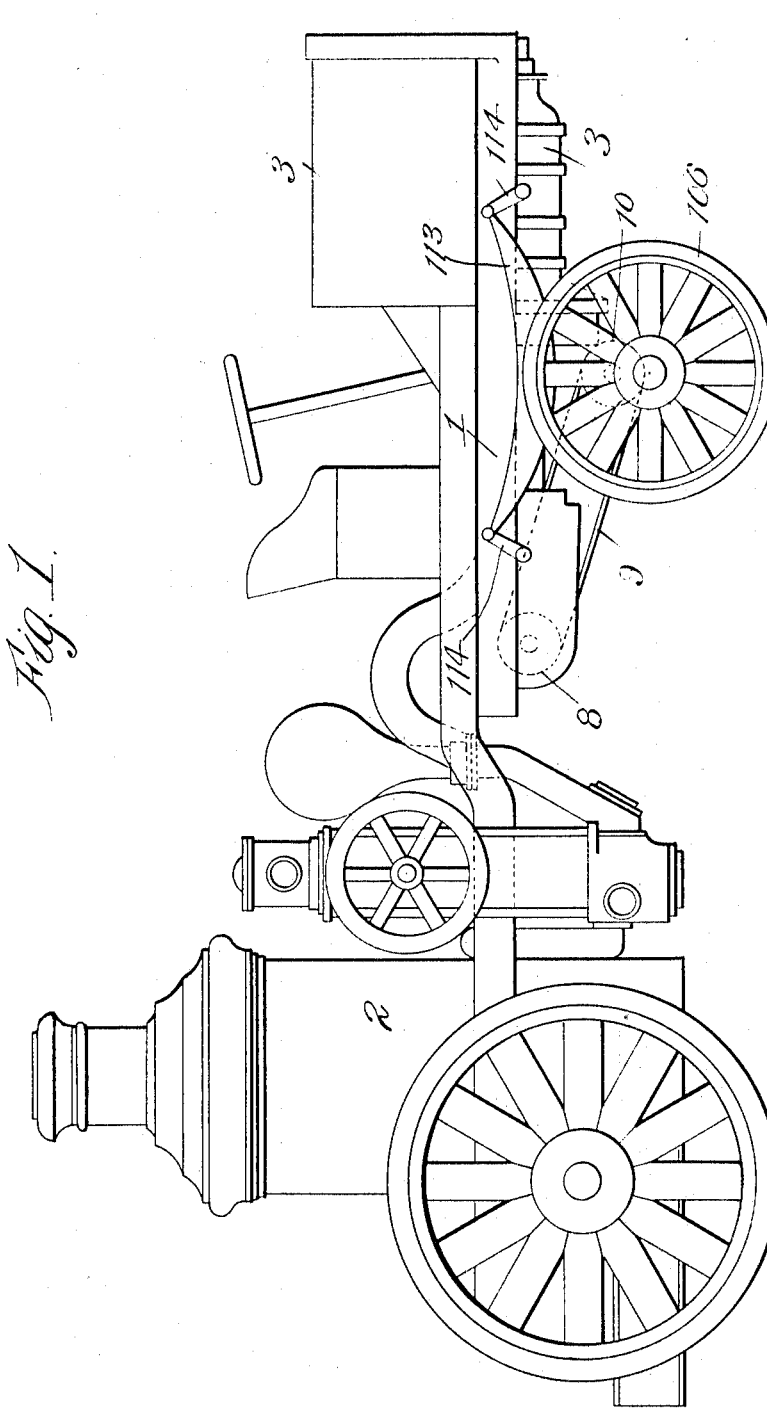

R. H. NESMITH.
MOTOR PROPELLED VEHICLE.
APPLICATION FILED NOV. 7, 1913.
1,116,102.
Patented Nov. 3, 1914.
8 SHEETS—SHEET 2.
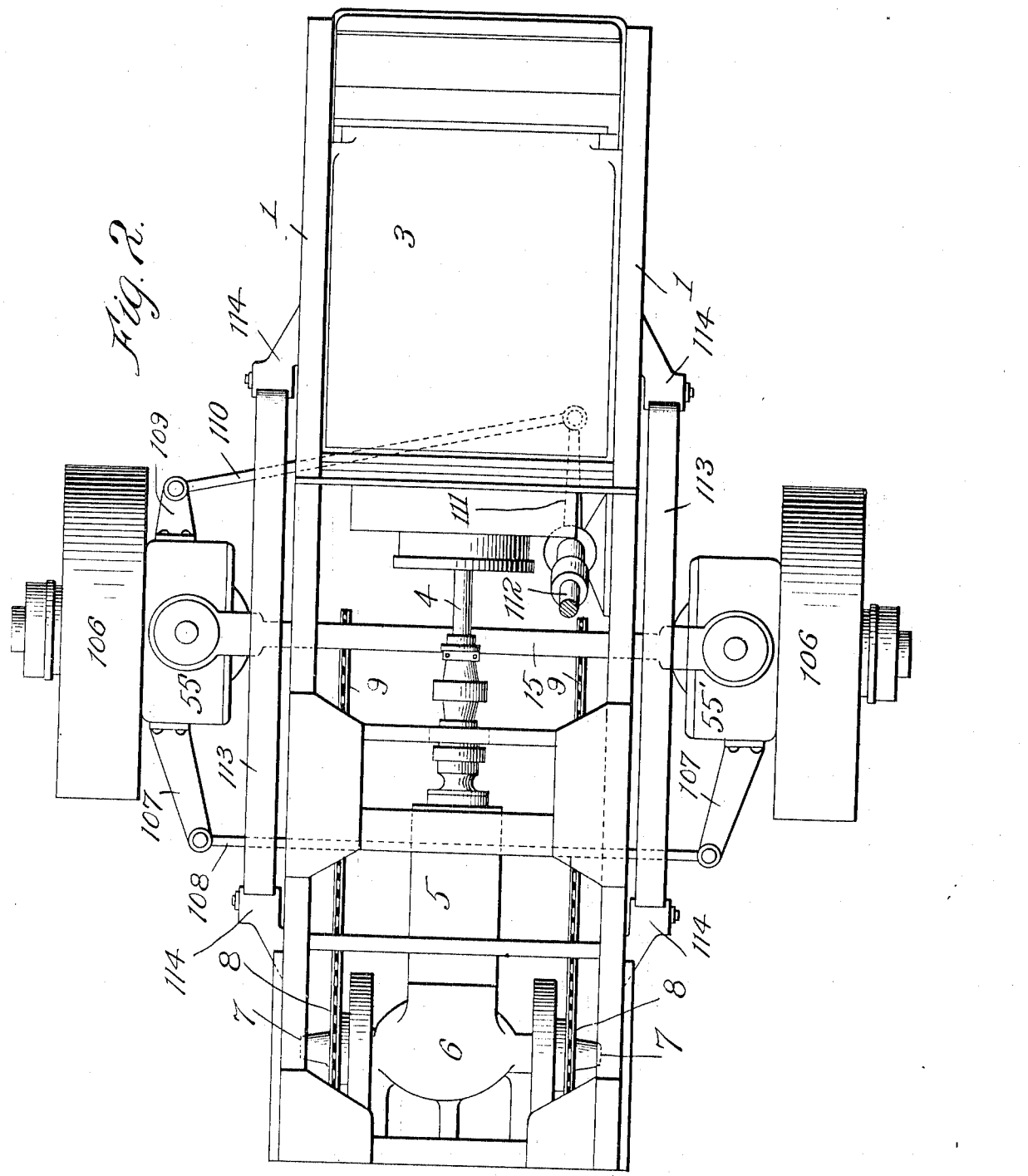

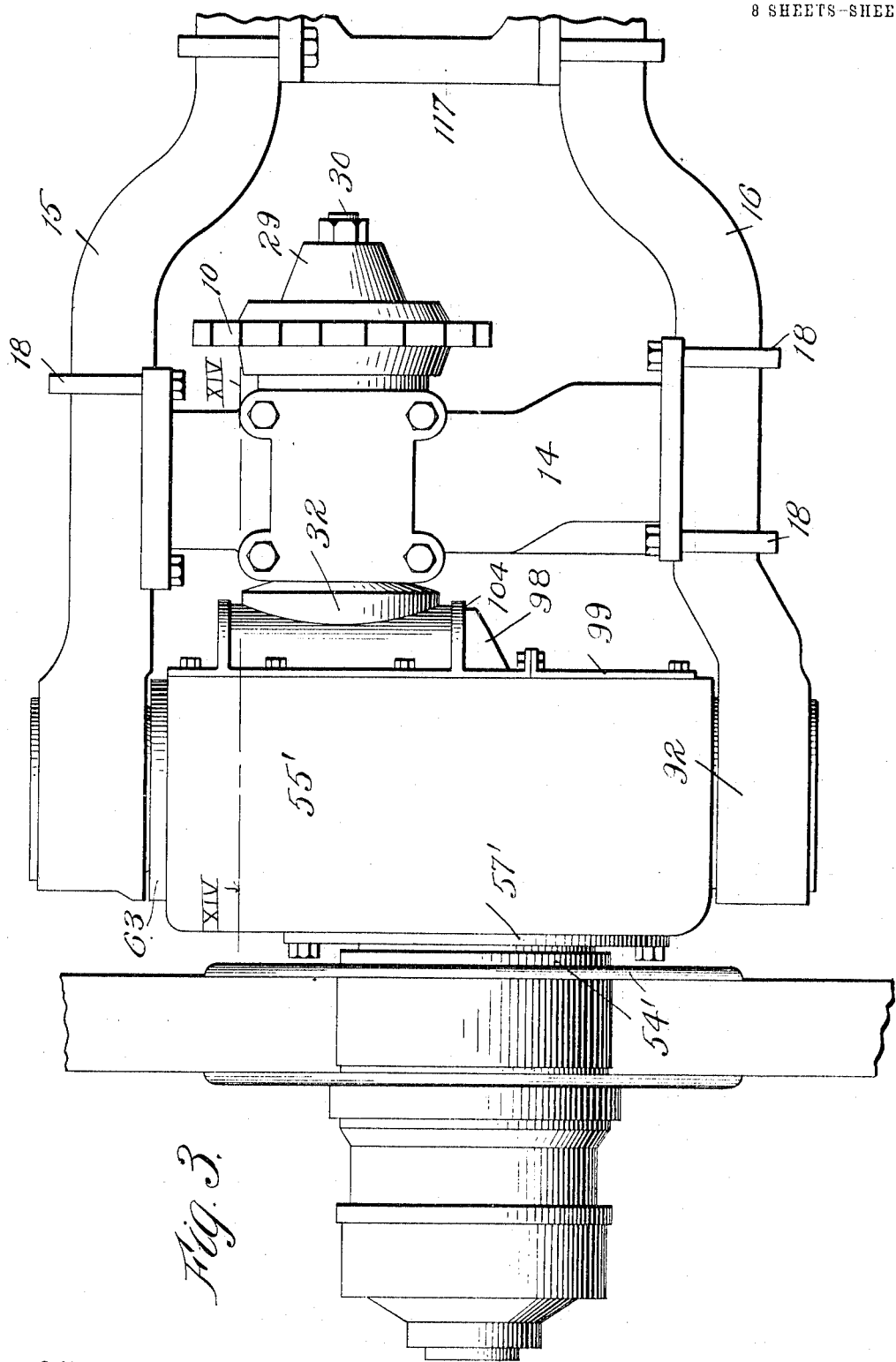

R. H. NESMITH.
MOTOR PROPELLED VEHICLE.
APPLICATION FILED NOV. 7, 1913.

1,116,102.

Patented Nov. 3, 1914.
8 SHEETS—SHEET 4.

Witnesses:
Wm. A. Cortelland
A. Wright

Inventor
Ralph H. Nesmith
By his Attorney

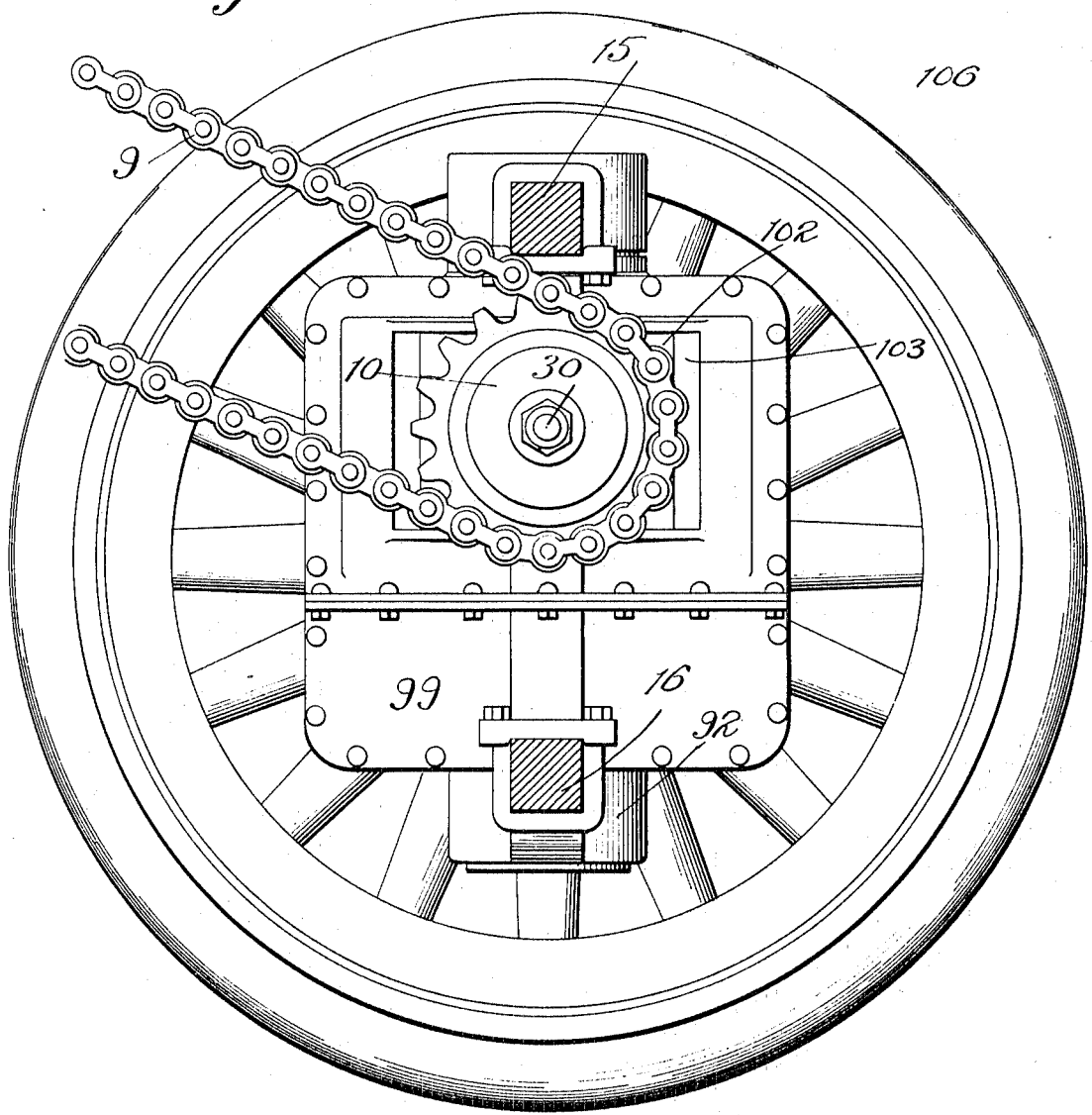

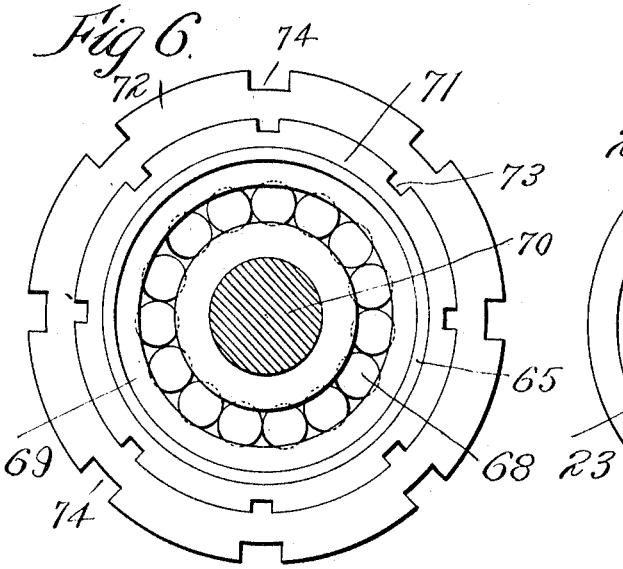
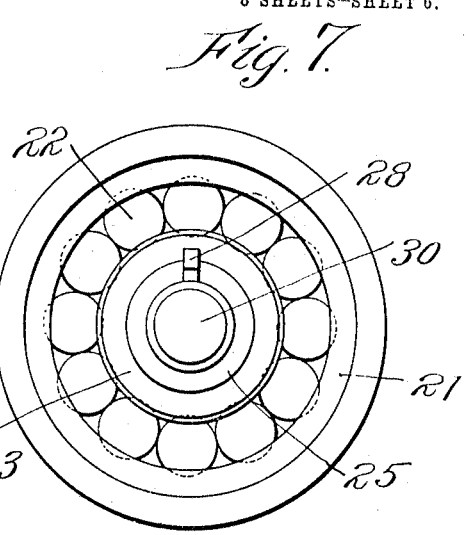
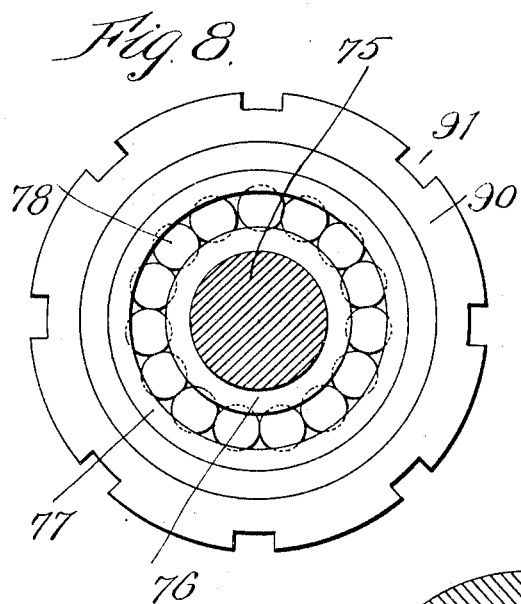
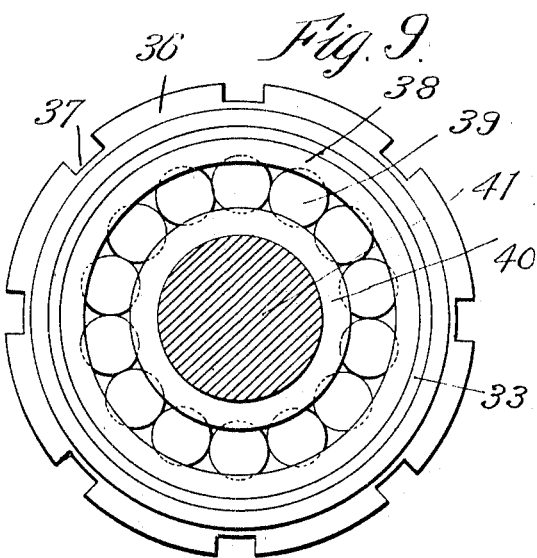
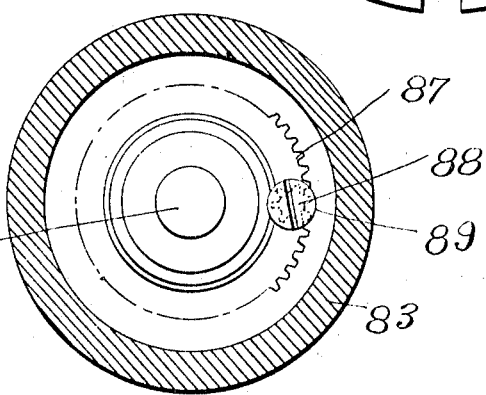

R. H. NESMITH.
MOTOR PROPELLED VEHICLE.
APPLICATION FILED NOV. 7, 1913.
1,116,102.
Patented Nov. 3, 1914.
8 SHEETS—SHEET 7.
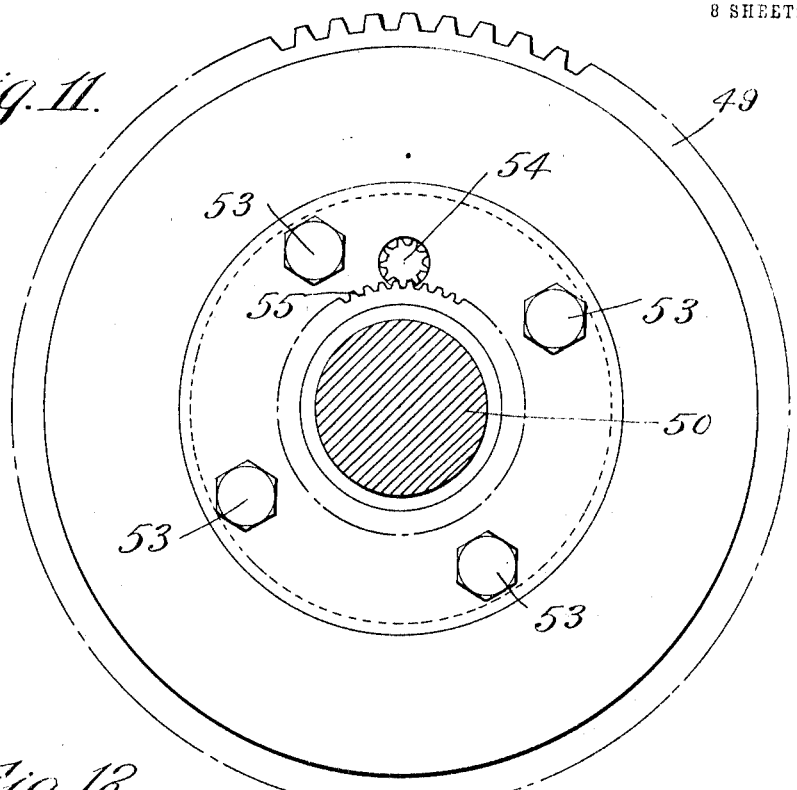
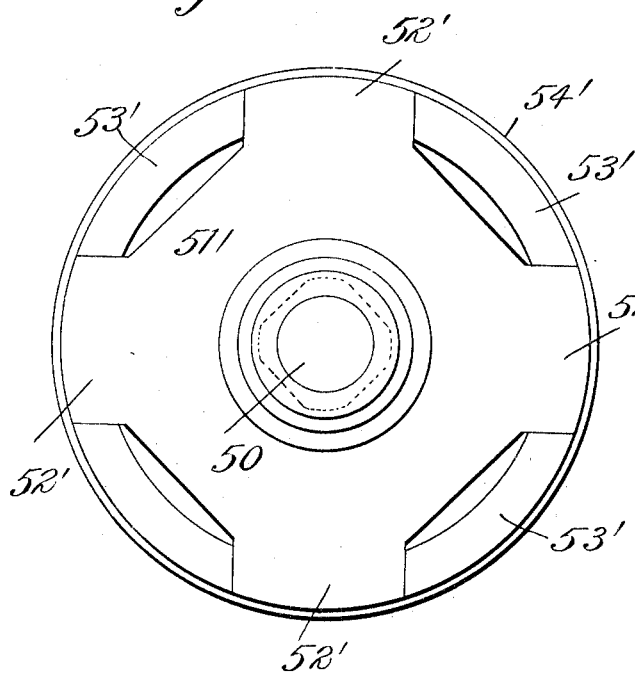
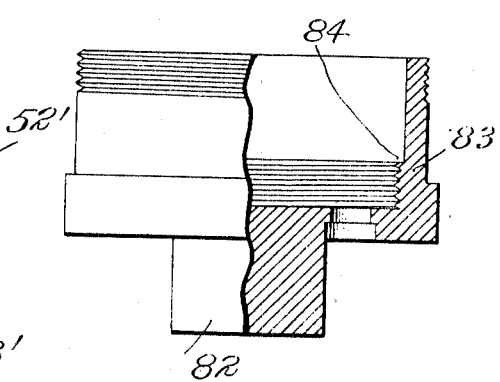

R. H. NESMITH.
MOTOR PROPELLED VEHICLE.
APPLICATION FILED NOV. 7, 1913.
1,116,102.
Patented Nov. 3, 1914.
8 SHEETS—SHEET 8.
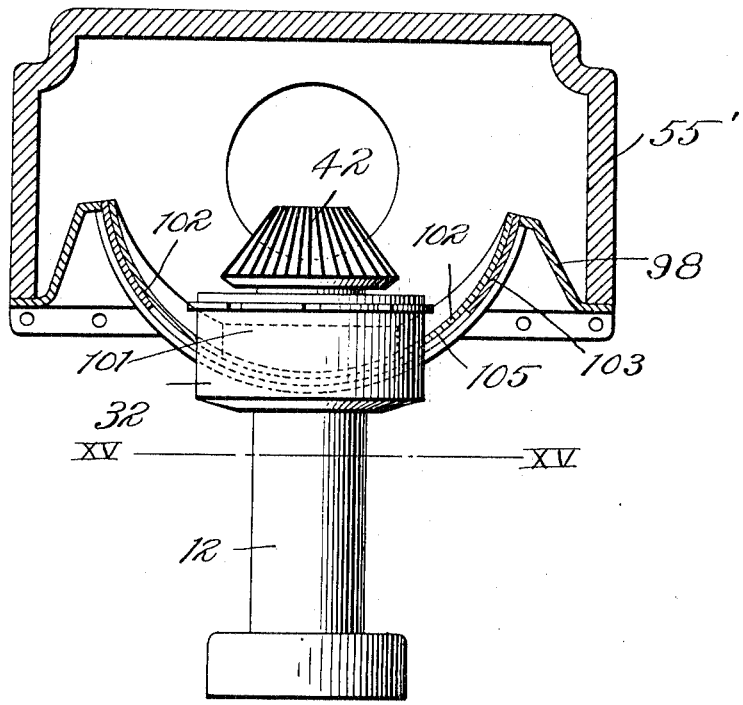
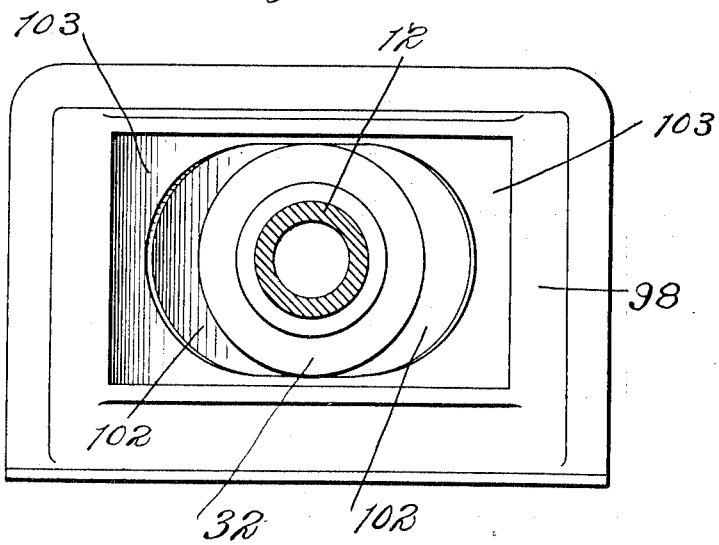
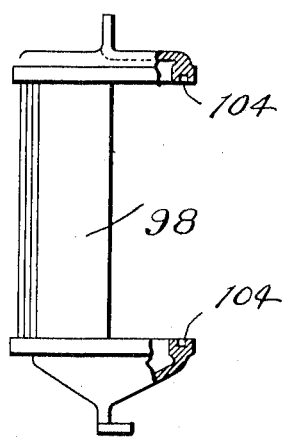

UNITED STATES PATENT OFFICE.

RALPH H. NESMITH, OF ELMIRA, NEW YORK, ASSIGNOR TO AMERICAN-LA FRANCE FIRE ENGINE COMPANY, INC., OF ELMIRA, NEW YORK, A CORPORATION OF NEW YORK.

MOTOR-PROPELLED VEHICLE.

1,116,102.      Specification of Letters Patent.      Patented Nov. 3, 1914.

Application filed November 7, 1913. Serial No. 799,730.

*To all whom it may concern:*

Be it known that I, RALPH H. NESMITH, a citizen of the United States, residing at Elmira, in the county of Chemung, and in the State of New York, have invented certain new and useful Improvements in Motor-Propelled Vehicles, of which the following is a full and clear specification.

This invention relates to motor propelled vehicles having fixed axles and in which the power driven wheels are suitably connected with said axles to swing about substantially vertical axes to permit the vehicle to be steered by means of the power driven wheels.

The primary object of this invention is to provide an improved construction, combination and arrangement of parts in a motor driven vehicle of this type, which will meet the practical requirements of heavy traffic under high speeds such for example as are met with in connection with modern fire apparatus motor driven vehicles. It will be understood however, that while the underlying principles of the present invention are of peculiar advantage in connection with fire-engine apparatus and other heavy motor driven vehicles, they are also applicable to automobiles in general.

One of the objects of this invention is to provide mechanism of improved construction for transmitting power from a power plant suspended from the chassis to the drive wheels which are mounted to swing about substantially vertical axes adjacent the outer extremities of axles which are substantially fixed to the chassis.

A further object is to provide an improved means for adjusting the relative positions of certain portions of the said power transmitting mechanism for the purpose of securing and maintaining the highest possible degree of efficiency in operation.

Another object is to provide an improved bearing block construction which affords an efficient housing for the gears embodied in the transmission mechanism referred to above.

Another object is to provide an improved adjustable connection between the bearing block or transmission housing and the fixed bearings of the cross shafts, to be hereinafter referred to, and which cross shafts receive power from the power plant suspended on the chassis of the motor vehicle.

Other and further objects will appear in the specification and be pointed out in the appended claims, reference being had to the accompanying drawings which exemplify the invention.

In the drawings,—Figure 1 is a side elevation of a motor fire engine embodying my improvements; Fig. 2 is a plan view of the forward portion of the chassis, showing portions of the power plant, operating mechanism and steering gear; Fig. 3 is a fragmentary front elevation of the chassis; Fig. 4 is a vertical section of the parts shown in Fig. 3, parts being broken away and parts shown in elevation; Fig. 5 is a section on the line V—V, Fig. 4; Fig. 6 is a section on the line VI—VI, Fig. 4; Fig. 7 is a section on the line VII—VII, Fig. 4, the power driven sprocket being removed; Fig. 8 is a section on the line VIII—VIII, Fig. 4; Fig. 9 is a section on the line IX—IX, Fig. 4; Fig. 10 is a section on the line X—X, Fig. 4; Fig. 11 is a section on the line XI—XI, Fig. 4; Fig. 12 is an end elevation corresponding to the line XII—XII, Fig. 4, with the hub cap removed; Fig. 13 is a detail view partly in elevation and partly in section of one of the bearing caps, to be hereinafter referred to, in the lower portion of Fig. 4; Fig. 14 is a section on the line XIV—XIV, Fig. 3; Fig. 15 is a section on the line XV—XV, Fig. 14; Fig. 16 is an end elevation of portions shown in Fig. 15.

In the embodiment of my invention shown on the drawings, an automobile fire engine is provided with a chassis, including the forward frame 1 which is rigidly bolted to a rear frame 2. The power plant which is secured to the chassis includes a motor or engine 3, a shaft 4 which is suitably connected with the transmission 5. Connected with the transmission 5 is a differential 6 for delivering power to the jack shafts 7, which in the present embodiment of my invention extend laterally from said differential. Each of the jack shafts 7 carries a sprocket wheel 8 which transmits by a sprocket chain 9 to the sprocket wheel 10 mounted on a cross shaft 11. Said cross shaft 11 is journaled within a bearing box 12 which is secured to a rigid support or tie bar 14 which extends between the upper branch 15 and the lower branch 16 of a forked axle. Bearing plates 17 which are rigid with the upper and lower ends respectively of the support 14, abut directly against the branches 15 and 16 of the forked axle and are rigidly secured to said branches by the straps 18 and a conical bolt 19. The inner end of the box 12 is provided with an enlargement 20 within which is mounted a race ring 21 for the balls 22 of a ball bearing. A bearing ring 23 which is secured to the cylindrical portion 24 of the cross shaft 11, runs on the balls 22. Threaded to the portion 24 of the shaft 11 is a ring 25 which is locked in position by a set screw 26. In the present embodiment, the cross shaft 11 is provided with a conical portion 27 provided with a spline or feather 28 which is adapted to lock the hub 29 of the sprocket 10 against rotation relatively to the cross shaft 11. A nut 29' which is threaded to the nib 30 on the end of the shaft 11, serves to retain the sprocket 10 against displacement. The sprocket 10 is provided with a packing ring 31 for excluding the dust from the ball bearings just referred to. On its outer end, the bearing box 12 is provided with another enlargement 32 within which is movably arranged a sleeve 33, said sleeve being provided on its inner end with a flange 34 and on its outer end having an adjusting annulus 35 threaded thereto. By referring to Fig. 9, it will be seen that the flange 36 of the threaded annulus 35, is provided with peripheral notches 37 for the reception of a wrench or spanner, whereby the sleeve 33 may be moved inwardly and outwardly as the case may be, to adjust the position of a race ring 38 which abuts against the flange 34, the raceway within the ring 38 serving to constrain the movements of the balls 39 which are disposed between the ring 38 and a bearing ring 40, which is secured to the hub portion 41 of a bevel gear 42. Preferably, as shown on the drawings, the bevel 42 forms an integral portion of the shaft 11. A retaining ring 43 which is threaded to the shaft 11 and locked in position by a screw 44, serves to determine the position of the ring 40. A set screw 45 which is threaded into the wall of the enlargement 32, serves to lock the sleeve 33 in adjusted position. The bevel gear 42 meshes with another bevel gear 46, which is keyed to a vertical drive shaft 47, which rotates upon an axis coincident with the axis about which the wheel swings during the steering operations of the vehicle, as will be hereinafter pointed out. Preferably integral with the lower end of the drive shaft 47, is another bevel gear 48 which meshes with a bevel gear 49 which is carried by a shaft 50 journaled in the dead journal 57'. For this purpose, the gear 49 is provided with an annular flange or web 51 which is secured to a disk 52 by means of bolts 53. Disk 52 is forced to rotate with the shaft 50, preferably by being constructed integral therewith as shown in Fig. 4. Journaled within the disk 52 is a pinion 54 which is geared to a ring 55 which is connected by a screw thread to the threaded portion 56 of the shaft 50. The ring 55 abuts laterally against a bearing race ring 57 which is carried by the inner end of the shaft 50. The outer end of the shaft 50 is non-rotatably connected to a clutch disk 51', preferably by having the squared outer end of said shaft inserted into an opening of similar form in the center of the clutch disk 51'. As shown best in Fig. 12, the clutch disk 51' is provided with radially arranged projections 52' which interengage with the peripheral segments 53', which project outwardly from the hollow hub 54' of the wheel.

A hollow bearing box or housing 55' which is mounted to swing about the axis of the drive shaft 47 in the manner to be hereinafter pointed out, has secured thereto by means of the bolts 56', a journal member 57' which serves to mount the wheel hub 54' by means of the timken bearings 58. In order to mount the hollow bearing block 55' so as to swing about the axis of the drive shaft 47, a plurality of timken rollers 59 are arranged concentrically about the axis of said shaft and intermediately to the outer end of the upper branch 15 of the forked axle and a journal post or trunnion 60, which is provided with a bearing ring 61. The journal post 60 is connected to the top wall of the bearing box 55' by means of a plurality of dowels 62, said dowels being mounted in the base flange 63 of said journal post. Depending from the base flange 63 is a cylindrical portion 64 within which is reciprocably mounted a sleeve 65 with an inturned top flange 66, which engages a race ring 67 for the balls 68 which travel between it and the bearing ring 69 which is mounted upon the upper journal 70 of the drive shaft 47. Suitable and efficient means may be provided for adjusting the upper ball bearing just described, by providing the sleeve 65 with external screw threads for the reception of an adjustment ring 71, which will impart an upward or downward movement to the race ring 67 whenever the threaded ring 71 is turned. Another ring 72 is threaded to the lower exterior wall of the cylindrical portion 64, said ring being thereby adapted to be moved into snug fitting contact with the top wall of the bearing box 55'. From an inspection of Fig. 6, it will be seen that the bearing ring 71 is provided with a plurality of peripheral notches 73, adapting said rings to be adjusted by means of a wrench or spanner. Similarly the ring 72 is provided with notches 74 for the same purpose. Referring now to the lower portion of Fig. 4, the lower end of the drive shaft 47 is provided with a journal 75 which carries a bearing ring 76. Interposed between the bearing ring 76 and a race ring 77 are balls 78. Threaded upon the reduced portion 79 at the lower end of shaft 47 is a nut 80 between which and the journal 75 is interposed a washer 81 which extends laterally underneath the bearing ring 76. The nut 80 together with the reduced portion 79 bears directly upon a base block 82 which preferably constitutes an integral portion of the retainer cup 83, shown in detail in Fig. 13. By an inspection of Fig. 13 it will be noted that said cup 83 is provided with an interior recess 84 within which the race ring 77 is adapted to be seated. Immediately below the annular recess 84 an interiorly threaded portion is adapted to receive an exteriorly threaded ring 86, said ring 86 being provided interiorly with gear teeth as shown more clearly at 87 in Fig. 10. Journaled within one edge of the ring 86 is a small pinion 88 which carries a slotted head 89 which is adapted to receive a screw driver. It will be seen therefore, that by rotating the pinion 88 within the retaining cup, a rotary movement will be imparted to the ring 86, with the result that said ring 86, together with the race ring 77, will be adjusted up or down to correspond with the direction of rotation of the gear pinion 88. In addition to this relative adjustment of the rings 76 and 77, an adjustment of the bearing as a whole is made possible by an annulus 90, which is threaded to the upper edge of the retaining cup 83. Said ring 90 has its lower face slidably engaging the lower end of the hollow bearing block 55', and is provided with peripheral notches 91, as shown in Fig. 8. The lower end of the bearing block 55' is supported by the lower branch 16 of the forked axle by means of the following device. Said lower branch 16 is provided at its outer end with an annular strap or sleeve 92, within which the retaining cup 83 is slidably mounted. On the block 82 of the retaining cup 83 is provided a bearing ring 93 between which and a conical race ring 94 are interposed a plurality of timken rollers 95. The race ring 94 is supported within an annular recess within a bushing 96 which is threaded to the inner cylindrical wall of the sleeve or annulus 92 on the end of said lower branch 16. A cap 97 serves to close a bottom opening in the sleeve or annulus 92. In order to permit the swinging movements of the bearing box 55', together with the wheel carried thereon, while at the same time maintaining a dust-proof housing for the drive shaft 47 and gears 42—46—48 and 49, as well as the parts contiguous thereto, I preferably employ the following construction for the inner wall of the bearing box or housing 55'. Said inner wall comprises an upper shell 98 and a lower shell 99, said shells being secured together by suitable fastening, such as the bolts 100.

By an inspection of Fig. 4, it will be noted that the cylindrical enlargement 32 of the bearing box 12 has mounted thereon, the cylindrical sleeve or shell portion 101 of a shutter which slides relatively to the upper shell 98 when the bearing block or housing 55' is oscillated on the axis of shaft 47. Projecting forwardly and rearwardly of the sleeve or cylindrical portion 101, are a pair of wings or shields 102 which are curtailed in length so as not to unnecessarily limit the swinging movements of the wheel. In order, however, to maintain a close housing during the swinging movements of the wheel, a second shutter or shield 103 is provided which is slidably mounted in a groove track or runway 104, and has its inside face bearing against the outside face of the wings or shields 102. Said shutter or shield 103 extends for a greater distance on opposite sides of the cylindrical portion 32 of the bearing 12, than do the wings or shields 102 of the first mentioned shutter. The second shutter 103, however, is provided with an elongated opening 105 as seen in Fig. 14. It will be seen therefore, that whenever the wheel is swung about the axis of the shaft 47 in steering the vehicle, the shutter comprising the wings or shields 102 will serve to close the elongated opening 105 in the shutter 103, whatever the relative angular position of the two shutters may be. At the same time, the inner shutter being of less length, will not impede the swinging movements of the wheel, while the greater length of the outer shutter 103 will not impede the swinging movement within certain desirable limits, since it will not be shifted in position until after said wheel has been swung through a large portion of its steering movement.

As indicated on Figs. 2, 3 and 4, the hereinbefore described driving and steering mechanism is, in the present embodiment of my invention, embodied on opposite sides of the chassis. The same idea may, of course, be embodied on the rear end of the chassis, as well as on the forward end thereof, but inasmuch as such a construction would be very similar to the one already shown and described, the foregoing description will suffice to make this application clear. Referring now to Fig. 2, the steering gear as a whole will be made evident. Thus each of the wheels 106 is journaled upon the box journals 57' which project laterally from the bearing box in the manner hereinbefore described. As shown in Fig. 2, each of the bearing boxes 55' is provided with a forwardly projecting bracket 107, said brackets being positively connected by means of an inextensible bar or rod 108, which therefore causes the steering movements of one wheel to be transmitted to the other wheel. Projecting rearwardly from one of the bearing boxes 55' is a bracket arm 109, to which one end of a connecting rod 110 is pivotally connected. The other end of said connecting rod 110 is pivotally connected to a lever arm 111, which is carried by the lower end of the steering post 112. From an inspection of Figs. 1 and 2, it will be seen that the frame 1 is supported from the forked axle by means of leaf springs 113, which bear directly upon the upper branch 15 of said axle. The outer ends of the spring 113 are connected by links 114 with the frame 1.

The various adjustments, method of operation, and advantages to be secured by my invention, will now be understood.

Referring first to Fig. 4, I have found the most effective procedure in adjusting the relative positions of the parts to be as follows: First, to adjust the relations between the bevel gears 48 and 49; this may be done as follows: The ball bearings including rings 76 and 77 having been adjusted by means of the adjusting ring 86 which is turned by the pinion 88, the vertical position of the bearing as a whole is next adjusted by rotating ring 90 which raises and lowers the retaining cup 83. The adjustment between the bevel gears 48 and 49 having been partially accomplished by this means, the position of the bevel gear 49 is next accomplished by means of the pinion 54 which rotates the ring 55 and serves to move the gear 49 to the right or left as may be desired. Should it then be found necessary to adjust the upper bearing of the drive shaft 47, the relative positions of the rings 67 and 69 are adjusted by means of the adjusting ring 71, which serves to move the ring 67 vertically. During or after this adjustment, it will be necessary to adjust the position of the slack take-up ring 72 which will then be made to fit snugly against the inner surface of the top wall of the bearing box or housing 55'. The next adjustment in order will then be the bevel gear 42 on the cross shaft 11 with respect to the bevel gear 46. For this purpose, the ring 35 may be rotated to move the race ring 38 to the right or left with respect to the bearing ring 40 to properly set the bevel gear 42. The inner end of the shaft 11 must then be adjusted to bring about a proper relationship between the race ring 21 and the bearing ring 23. The position of the latter is controlled by means of the adjusting ring 25 which serves this purpose.

By means of the construction shown on Fig. 4, the sprocket wheel which receives its power from the jack shaft 7, is insured a snug fit upon the inner end of the shaft 11, by means of the conical end 27 with the feather 28 and the nut 29. The construction of the inner wall of the bearing box or housing 55' has already been fully described with reference to the swinging movements of the wheels. In addition thereto, the construction of said inner wall permits ready access to the upper and lower bearings of the drive shaft 47. It will be seen furthermore that the branches 15 and 16 of the forked axle are releasably connected together by means of the support or tie bars 14 on either side and by means of a central connecting bracket 117. It will be seen from an inspection of Fig. 4 that the adjustments of the lower and upper shaft bearings can be effected through the open rear wall of the housing or bearing box 55', as well as the adjustments connected with the bevel gear 49 through the agency of the pinion 54.

What I claim is:

1. In a motor driven vehicle, an axle comprising spaced branches, a hollow bearing block journaled in the outer ends of said branches, a shaft journaled within said hollow bearing block and coaxially with the first said axle, a support or tie bar connecting said branches, a cross shaft journaled therein and geared to the first said shaft, a wheel rotatably mounted on said bearing block, and means for connecting the first said shaft to said wheel.

2. In a motor driven vehicle, an axle provided with spaced branches, a hollow bearing block journaled in said branches, a hollow journal projecting from the outer wall of said bearing block, a wheel on said hollow journal, a shaft journaled in said hollow journal and connected to said wheel, a shaft journaled in said bearing block and having one end geared to the shaft in said journal, and a cross shaft geared to the other end of said shaft in the hollow bearing block, said hollow bearing block being provided with an extended wall completely inclosing the geared connections between said shafts.

3. In a motor driven vehicle, an axle provided with spaced branches, a hollow bearing block journaled in said branches, a hollow journal projecting from the outer wall of said bearing block, a wheel on said hollow journal, a shaft journaled in said hollow journal and connected to said wheel, a shaft journaled in said bearing block and having one end geared to the shaft in said journal, and a cross shaft geared to the other end of said shaft in the hollow bearing block, said hollow bearing block being provided with an extended wall completely inclosing the geared connections between said shafts, said extended wall being provided with an opening through which the cross shaft extends and an adjustable closure therefor.

4. In a motor driven vehicle, the combination of an axle having spaced branches, the outer ends of said branches being provided with coaxially arranged bearings, bearing members comprising journals rotatably mounted in said bearings respectively and bearing rings presented inwardly toward each other, a hollow bearing block provided with coaxial openings which are filled by said bearing rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, and means for driving said shaft in the hollow bearing block.

5. In a motor driven vehicle, a power plant carried by said vehicle, a shaft driven by said power plant, a transmission shaft geared to said driven shaft, a housing inclosing said transmission shaft, said housing being suitably mounted to swing about the axis of said transmission shaft and having an opening for accommodating said driven shaft, a closure for said opening, an axle fixed to the outer wall of said housing, a wheel journaled on said axle, and a shaft journaled within said axle and having its opposite ends geared respectively to said wheel and transmission shaft, said closure comprising a shutter supported on the wall of said housing and having an elongated opening therein, and a fixed shutter closing said elongated opening.

6. In a motor driven vehicle, the combination of an axle having spaced branches, the outer ends of said branches being provided with coaxially arranged bearings, bearing members comprising journals rotatably mounted in said bearings respectively, and bearing rings presented inwardly toward each other, a hollow bearing block provided with coaxial openings which are filled by said bearing rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, and means for driving said shaft in the hollow bearing block, one of said bearing rings being provided with means for imparting an axial adjustment to the shaft journaled therein.

7. In a motor driven vehicle, a power plant carried by said vehicle, a shaft driven by said power plant, a transmission shaft geared to said driven shaft, a housing inclosing said transmission shaft, said housing being suitably mounted to swing about the axis of said transmission shaft and having an opening for accommodating said driven shaft, a closure for said opening, an axle fixed to the outer wall of said housing, a wheel journaled on said axle, and a shaft journaled within said axle and having its opposite ends geared respectively to said wheel and transmission shaft, said closure comprising a shutter supported on the wall of said housing and having an elongated opening therein, and a fixed shutter closing said elongated opening, the first said shutter being movably mounted on the wall of said housing.

8. In a motor driven vehicle, the combination of an axle having spaced branches, the outer ends of said branches being provided with coaxially arranged bearings, bearing members comprising journals rotatably mounted in said bearings respectively, and bearing rings presented inwardly toward each other, a hollow bearing block provided with coaxial openings which are filled by said bearing rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, and means for driving said shaft in the hollow bearing block, one of said bearing rings being provided with means for imparting an axial adjustment to the shaft journaled therein, said adjusting means comprising an annulus threaded to one of said bearing rings, said annulus being slidably mounted on the lower wall of said bearing block.

9. In a motor driven vehicle, the combination of an axle having spaced branches, the outer ends of said branches being provided with coaxially arranged bearings, bearing members comprising journals rotatably mounted in said bearings respectively and bearing rings presented inwardly toward each other, a hollow bearing block provided with coaxial openings which are filled by said bearing rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, and means for driving said shaft in the hollow bearing block, one of said bearings being provided with relatively adjustable race rings and means for adjusting one of said race rings relatively to the other.

10. In a motor driven vehicle, the combination of an axle having spaced branches, the outer ends of said branches being provided with coaxially arranged bearings, bearing members comprising journals rotatably mounted in said bearings respectively and bearing rings presented inwardly toward each other, a hollow bearing block provided with coaxial openings which are filled by said bearing rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, a rotatable ring threaded to the inner wall of the bearing ring of one of said bearing members, a race ring supported by said rotatable ring, another race ring surrounding the journal, and means for rotating said rotatable ring to adjust the relative position of said race rings, and anti-friction elements disposed between said race rings, and means for driving said shaft journaled in the hollow bearing block.

11. In a motor driven vehicle, the combination of an axle having spaced branches, the outer ends of said branches being provided with coaxially arranged bearings, bearing members comprising journals rotatably mounted in said bearings respectively and bearing rings presented inwardly toward each other, a hollow bearing block provided with coaxial openings which are filled by said bearings rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, and means for driving said shaft in the hollow bearing block, said geared connections comprising gears connected to said shafts respectively and means for axially adjusting said shaft in the hollow journal.

12. In a motor driven vehicle, the combination of an axle having spaced branches, the outer ends of said branches being provided with coaxially arranged bearings, bearing members comprising journals rotatably mounted in said bearings respectively and bearing rings presented inwardly toward each other, a hollow bearing block provided with coaxial openings which are filled by said bearing rings respectively, a hollow journal projecting from the outer wall of said bearing block, a wheel journaled thereon, a shaft in said hollow journal connected to said wheel, a shaft having its opposite ends journaled in said bearing rings respectively, geared connections between said shafts, and means for driving said shaft in the hollow bearing block, said geared connections comprising gears connected to said shafts respectively and means for axially adjusting said shaft in the hollow journal, said adjusting means including a gear ring threaded to said shaft and in abutment with a member which is supported against axial displacement along the shaft in said journal, and a pinion journaled in the journal shaft gear and meshing with said pinion.

13. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said closure comprising relatively movable portions.

14. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said closure comprising relatively movable portions, respectively capable of different degrees of movement.

15. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel, a housing mounted to swing about the axis of said drive shaft and upon which said steering wheel is journaled, said housing being provided with an opening for accommodating said cross shaft, and a closure for said opening adapted to completely close said opening for all positions of said steering wheel, said closure including a shutter which partakes of a portion only of the movement of said housing.

16. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said closure including a shutter with an elongated opening therein, and means for closing said opening in the shutter.

17. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said closure including a shutter having an opening therein elongated to correspond with a portion of the possible angular displacement of said housing, and a second shutter adapted to close said opening in the first shutter.

18. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said closure including a shutter having an opening therein elongated to correspond with a portion of the possible angular displacement of said housing, and a second shutter adapted to close said opening in the first shutter, the first said shutter being slidably mounted to permit an additional angular movement over and above that permitted by said opening therein.

19. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said closure including relatively movable shutters.

20. In a motor driven vehicle, the combination of a chassis, a power plant mounted thereon, a cross shaft journaled on a substantially fixed axis, said cross shaft being connected to said power plant, a drive shaft to which said cross shaft delivers power, a power-driven steering wheel mounted to swing about the axis of said drive shaft, a housing for said drive shaft upon which said steering wheel is journaled, said housing being provided with an opening for accommodating said cross shaft, and a closure for said opening adapted to completely close said opening for all positions of said steering wheel, said housing being provided with a track or guide arranged adjacent the opening therein, and a shutter slidably mounted on said track or guide and constituting a portion of said closure.

21. In a motor driven vehicle, the combination of a chassis, a power plant mounted thereon, a bearing arranged transversely of said chassis, a cross shaft journaled in said bearing, said cross shaft being connected to said power plant, a drive shaft to which said cross shaft delivers power, a housing for said drive shaft, said housing being provided with a journal projecting therefrom, an opening therein to accommodate said bearing, and a wheel mounted on said journal, said wheel being driven by said drive shaft, a guide or track arranged adjacent said opening, a shutter slidably mounted on said guide or track, and a second shutter mounted on said bearing.

22. In a motor driven vehicle, the combination of a chassis, a power plant mounted thereon, a bearing arranged transversely of said chassis, a cross shaft journaled in said bearing, said cross shaft being connected to said power plant, a drive shaft to which said cross shaft delivers power, a housing for said drive shaft, said housing being provided with a journal projecting therefrom, and an opening therein to accommodate said bearing, a wheel mounted on said journal, said wheel being driven by said drive shaft, a guide or track arranged adjacent said opening, a shutter slidably mounted on said guide or track, and a second shutter mounted on said bearing, one of said shutters being provided with an elongated opening which is covered by the other said shutter.

23. In a motor driven vehicle, the combination of a chassis, a power plant mounted thereon, a drive shaft mounted to rotate upon a vertical axis, a steering wheel mounted to swing about said vertical axis, a shaft for transmitting power from the drive shaft to said wheel, intermeshing gears mounted respectively on said shafts, and means for adjusting one of said gears relatively to the other one.

24. In a motor driven vehicle, the combination of a chassis, a power plant mounted thereon, a drive shaft mounted to rotate upon a vertical axis, a steering wheel mounted to swing about said vertical axis, a shaft for transmitting power from the drive shaft to said wheel, intermeshing gears mounted respectively on said shafts, and means for adjusting one of said gears relatively to the other one, said adjusting means including a fixed member, a movable member connected thereto by screw threads, and means for rotating said movable member to adjust said gear.

25. In a motor driven vehicle, the combination of a chassis, a power plant mounted thereon, a drive shaft mounted to rotate upon a vertical axis, a steering wheel mounted to swing about said vertical axis, a shaft for transmitting power from the drive shaft to said wheel, intermeshing gears mounted respectively on said shafts, and means for adjusting one of said gears relatively to the other one, said adjusting means including a fixed support, a movable support, and a ring rotatably mounted on said fixed support and threaded to said movable support.

26. In a motor driven vehicle, the combination of a chassis, a power plant mounted thereon, a drive shaft mounted to rotate upon a vertical axis, a steering wheel mounted to swing about said vertical axis, a shaft for transmitting power from the drive shaft to said wheel, intermeshing gears mounted respectively on said shafts, and means for adjusting one of said gears relatively to the other one, said adjusting means including a retainer cup which movably supports the movable gear, a fixed support, and a ring rotatably mounted on said fixed support and connected by screw threads with said retainer cup.

27. In a motor driven vehicle, the combination of a chassis, a power plant mounted thereon, a drive shaft mounted to rotate upon a vertical axis, a steering wheel mounted to swing about said vertical axis, a shaft for transmitting power from the drive shaft to said wheel, intermeshing gears mounted respectively on said shafts, and means for adjusting one of said gears relatively to the other one, said adjusting means including a retainer cup which movably supports the movable gear, a fixed support, and a ring rotatably mounted on said fixed support and connected by screw threads with said retainer cup, said ring being provided with peripheral notches adapting it to be rotated by a wrench or spanner.

28. In a motor driven vehicle, the combination of a chassis, a drive shaft rotatable about a vertical axis, a power plant mounted on said chassis and connected to said drive shaft, a steering wheel mounted to swing about the axis of said drive shaft and having driving connection therewith, a bearing for said drive shaft embodying relatively movable bearing rings, a rigid support, a movable support threaded to said fixed support and supporting one of said bearing rings, and means for rotating said movable support to adjust the position of the bearing ring supported thereby.

29. In a motor driven vehicle, the combination of a chassis, a drive shaft rotatable about a vertical axis, a power plant mounted on said chassis, and connected to said drive shaft, a steering wheel mounted to swing about the axis of said drive shaft and having driving connection therewith, a bearing for said drive shaft embodying relatively movable bearing rings, a rigid support, a movable support threaded to said fixed support and supporting one of said bearing rings, and means for rotating said movable support to adjust the position of the bearing ring supported thereby, said rotating means comprising a pinion geared to said rotary support.

30. In a motor-driven vehicle, the combination of a chassis, a power plant mounted thereon, a hollow bearing block pivotally connected to said chassis on a substantially vertical axis, a shaft within said bearing block and coaxial with the pivotal axis thereof, means for transmitting power from said power plant to said shaft, a hollow dead journal projecting outwardly from said bearing block, a wheel journaled thereon, a shaft journaled in said dead journal and connected to said wheel, said shaft being movable axially in said dead journal, a member relatively to which such axial movement may be made, a ring threaded to said shaft and abutting against said member, intermeshing gears carried by said shafts respectively, and means for angularly moving said ring to impart an axial movement to the shaft in said dead journal.

31. In a motor-driven vehicle, the combination of a chassis, a power plant mounted thereon, a hollow bearing block pivotally connected to said chassis on a substantially vertical axis, a shaft within said bearing block and coaxial with the pivotal axis thereof, means for transmitting power from said power plant to said shaft, a hollow dead journal projecting outwardly from said bearing block, a wheel journaled thereon, a shaft journaled in said dead journal and connected to said wheel, said shaft being movable axially in said dead journal, a member relatively to which such axial movement may be made, a ring threaded to said shaft and abutting against said member, intermeshing gears carried by said shafts respectively, and means for angularly moving said ring to impart an axial movement to the shaft in said dead journal, said means comprising a pinion journaled in the gear in the shaft journaled in said dead journal, said ring being provided with gear teeth intermeshing with said pinion.

32. In a motor-driven vehicle, the combination of a chassis, a power plant mounted thereon, a hollow bearing block pivotally connected to said chassis on a substantially vertical axis, a shaft within said bearing block and coaxial with the pivotal axis thereof, means for transmitting power from said power plant to said shaft, a hollow dead journal projecting outwardly from said bearing block, a wheel journaled thereon, a shaft journaled in said dead journal and connected to said wheel, said shaft being movable axially in said dead journal, a gear mounted on the end of said axially movable shaft within said hollow block, a member relatively to which said shaft is axially movable, a ring abutting against said member and suitably connected to said shaft to impart an axial adjustment to said shaft, and means carried by said gear for moving said ring, said gear being geared to the vertical shaft in said bearing block.

33. In a motor driven vehicle, the combination of a chassis, a power plant mounted thereon, a hollow bearing block pivotally connected to said chassis on a substantially vertical axis, a shaft within said bearing block and coaxial with the pivotal axis thereof, means for transmitting power from said power plant to said shaft, a hollow dead journal projecting outwardly from said bearing block, a wheel journaled thereon, a shaft journaled in said dead journal and connected to said wheel, said shaft being movable axially in said dead journal, a disk secured to the end of said axially movable shaft within said journal, a gear ring threaded to said shaft for imparting an axial adjustment thereto, a race ring on said shaft in lateral abutment with said gear ring, a pinion journaled in said disk and geared to said ring gear, and intermeshing gears mounted on said disk and vertical shaft respectively.

34. In a motor driven vehicle, the combination of a chassis, a power plant mounted thereon, a hollow bearing block pivotally connected to said chassis on a substantially vertical axis, a shaft within said bearing block and coaxial with the pivotal axis thereof, means for transmitting power from said power plant to said shaft, a hollow dead journal projecting outwardly from said bearing block, a wheel journaled thereon, a shaft journaled in said dead journal and connected to said wheel, said shaft being movable axially in said dead journal, a disk secured to the end of said axially movable shaft within said journal, a gear ring threaded to said shaft for imparting an axial adjustment thereto, a race ring on said shaft in lateral abutment with said gear ring, a pinion journaled in said disk and geared to said ring gear, and intermeshing gears mounted on said disk and vertical shaft respectively, said hollow bearing box being provided with a movable wall permitting access to said pinion for effecting such adjustment.

35. In a motor driven vehicle, the combination of a chassis, a power plant mounted thereon, a hollow bearing block pivotally connected to said chassis, on a substantially vertical axis, a shaft within said bearing block and coaxial with the pivotal axis thereof, means for transmitting power from said power plant to said shaft, a hollow dead journal projecting outwardly from said bearing block, a wheel journaled thereon, a shaft journaled in said dead journal and connected to said wheel, said shaft being movable axially in said dead journal, a disk secured to the end of said axially movable shaft within said journal, a gear ring threaded to said shaft for imparting an axial adjustment thereto, a race ring on said shaft in lateral abutment with said gear ring, a pinion journaled in said disk and geared to said gear ring, and intermeshing gears mounted on said disk and vertical shaft respectively, said wheel and shaft in the dead journal being provided with means for maintaining their operating connection for different axial adjustments of said shaft.

36. In a motor driven vehicle, the combination of a chassis, a power plant mounted thereon, a hollow bearing block pivotally connected to said chassis on a vertical axis, said bearing block being provided with a hollow dead journal projecting outwardly and an inwardly presented removable wall, a wheel mounted on said journal, a shaft journaled within said journal and connected to said wheel, power transmission mechanism within said hollow block adapted to deliver power to said shaft, means for connecting said power plant to said power transmitting mechanism, means for moving said shaft axially to adjust it relatively to said power transmission mechanism, said shaft moving means including an element adjustable from within said hollow block, and a removable cover for said hollow block for permitting access to said element.

37. In a motor driven vehicle, the combination of a chassis, a power plant mounted thereon, a hollow bearing block pivotally connected to said chassis on a vertical axis, said bearing block being provided with a hollow dead journal projecting outwardly and an inwardly presented removable wall, a wheel mounted on said journal, a shaft journaled within said journal and connected to said wheel, power transmission mechanism within said hollow block adapted to deliver power to said shaft, means for connecting said power plant to said power transmitting mechanism, means for moving said shaft axially to adjust it relatively to said power transmission mechanism, said shaft moving means including an element adjustable from within said hollow block, a cover wall for said hollow block constructed in separately removable sections, one of said sections permitting access to said element and the other of said sections being provided with an opening, a cross shaft extending through said opening and constituting a portion of said means for connecting the power plant with said power transmitting mechanism, and a closure for said opening.

38. In a motor driven vehicle, a chassis, a power plant thereon, a hollow bearing block pivoted thereto on a vertical axis, a cross shaft rotatably mounted on said chassis and projecting into said hollow block, a wheel journaled on said hollow block, power transmission mechanism arranged within said hollow block for transmitting power from said cross shaft to said wheel, and means for imparting an axial adjustment to said cross shaft including a race ring and an element abutting against said race ring and movably engaging said cross shaft.

39. In a motor driven vehicle, a chassis, a power plant thereon, a hollow bearing block pivoted thereto on a vertical axis, a wheel rotatably mounted on said hollow bearing block, a cross shaft rotatably mounted on said chassis and projecting into said hollow block, power transmitting mechanism arranged within said hollow block for transmitting power from said cross shaft to said wheel, a bearing housing for said cross shaft provided with an enlargement, a sleeve reciprocable in said enlargement, and an anti-friction bearing comprising race rings, one of said race rings being in engagement with said reciprocable sleeve.

40. In a motor driven vehicle, a chassis, a power plant thereon, a hollow bearing block pivoted thereto on a vertical axis, a wheel rotatably mounted on said hollow bearing block, a cross shaft rotatably mounted on said chassis, and projecting into said hollow block, power transmitting mechanism arranged within said hollow block for transmitting power from said cross shaft to said wheel, a bearing housing for said cross shaft provided with an enlargement, a sleeve reciprocable in said enlargement, an anti-friction bearing comprising race rings, one of said race rings being in engagement with said reciprocable sleeve, and a notched ring threaded to the exterior wall of said sleeve and abutting against said enlargement.

41. In a motor driven vehicle, an axle having spaced branches, a hollow bearing block journaled in said branches to swing about an axis, a shaft journaled within said block coaxially with said axis, a cross shaft geared to said shaft, the wall of said bearing block being provided with an opening through which said cross shaft extends, a shutter movably mounted to adjustably cover said opening, said shutter being provided with an opening for permitting a limited degree of relative movement between said cross shaft and shutter, a second shutter mounted on said shaft to close the opening in the first said shutter, a wheel journaled on said bearing block, and means for connecting said wheel to the shaft within said bearing block.

42. In a motor driven vehicle, the combination with a chassis, of a forked axle having spaced branches, a closed transmission housing journaled in said branches, said housing being provided with an inwardly-presented opening, a shaft journaled on a fixed axis and extending through said opening, an outwardly-presented dead journal mounted on said housing, a wheel journaled on said dead journal, a live spindle journaled in said dead journal and geared to said wheel, and transmission mechanism within said housing for transmitting power from said shaft to said live spindle.

RALPH H. NESMITH.

Witnesses:
JAMES R. CLARKE,
WM. A. COURTLAND.